(12) United States Patent
Resnikoff et al.

(10) Patent No.: US 6,553,080 B2
(45) Date of Patent: *Apr. 22, 2003

(54) CONSTANT ENVELOPE MODULATION COMMUNICATION SYSTEM

(75) Inventors: Howard L. Resnikoff, Boston, MA (US); Mark Tigerman, Reston, VA (US)

(73) Assignee: FutureWave, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/753,439

(22) Filed: Jan. 3, 2001

(65) Prior Publication Data

US 2001/0005404 A1 Jun. 28, 2001

Related U.S. Application Data

(62) Division of application No. 09/469,581, filed on Dec. 22, 1999.
(60) Provisional application No. 60/114,274, filed on Dec. 30, 1998.

(51) Int. Cl.[7] .............................. H03K 7/06; H03K 9/06
(52) U.S. Cl. ....................... 375/271; 375/302; 375/322; 375/343
(58) Field of Search .................. 375/350, 349, 375/322, 271, 324, 302, 343, 308, 279, 329; 329/345, 346; 332/144; 359/328, 340, 341

(56) References Cited

U.S. PATENT DOCUMENTS

| 3,949,314 | A | | 4/1976 | Machida |
|---|---|---|---|---|
| 3,995,120 | A | | 11/1976 | Pachynski, Jr. |
| 4,261,053 | A | * | 4/1981 | Dostis et al. ............... 375/297 |
| 4,328,495 | A | | 5/1982 | Thue |
| 4,598,411 | A | | 7/1986 | Berkovich et al. |
| 5,048,058 | A | | 9/1991 | Kaleh |
| 5,081,645 | A | | 1/1992 | Resnikoff et al. |

(List continued on next page.)

FOREIGN PATENT DOCUMENTS

| DE | 3536874 A1 | 4/1987 |
|---|---|---|
| EP | 0668 640 A1 | 8/1995 |

(List continued on next page.)

OTHER PUBLICATIONS

Prashant, P et. al., "Wavelets for Waveform Coding of Digital Symbols", IEEE Transactions on Signal Processing, 45(9) : 2387–2390 (Sep. 1997).

(List continued on next page.)

*Primary Examiner*—Chi Pham
*Assistant Examiner*—Phuong Phu
(74) *Attorney, Agent, or Firm*—Kevin A. Oliver; Foley Hoag LLP

(57) ABSTRACT

A communication system and method for continuous phase modulation providing for transmission of a phase-modulated carrier having a phaseform representative of concurrently transmitted symbols. The phaseform of the phase-modulated signal is a sum of shift bi-orthogonal functions, each term in that sum being weighted by one of the overlapping symbols. The communication system and method provide full-response demodulation for the recovery of a particular symbol from among the concurrently transmitted symbols by selecting a receiving filter function shift bi-orthogonal to the transmitter filter function corresponding to the particular symbol. The communication system and method then provide for nulling, by integration over a time interval during which the particular symbol is transmitted, those transmitter filter functions that do not correspond to the particular symbol. This results in the separation of the particular symbol from the other concurrently transmitted symbols.

82 Claims, 6 Drawing Sheets

U.S. PATENT DOCUMENTS

| | | | |
|---|---|---|---|
| 5,177,769 A | | 1/1993 | Arnold et al. |
| 5,323,260 A | * | 6/1994 | Alfano et al. ............... 359/244 |
| 5,349,585 A | | 9/1994 | Soukal |
| 5,623,511 A | | 4/1997 | Bar-David et al. |
| 5,680,414 A | | 10/1997 | Durrant et al. |
| 5,710,797 A | | 1/1998 | Segal et al. |
| 5,838,266 A | | 11/1998 | Houle et al. |
| 5,838,268 A | | 11/1998 | Frenkel |
| 5,868,268 A | | 2/1999 | Walker |
| 6,014,407 A | | 1/2000 | Hunsinger et al. |
| 6,298,099 B1 | * | 10/2001 | Resnikoff et al. ........... 375/322 |

FOREIGN PATENT DOCUMENTS

| | | |
|---|---|---|
| EP | 0853 434 A2 | 7/1998 |
| JP | 60019345 | 1/1985 |
| JP | 60111301 | 6/1985 |
| JP | 62257225 | 11/1987 |
| JP | 62287778 | 12/1987 |
| JP | 1293033 | 11/1989 |
| JP | 5160801 | 6/1993 |
| JP | 5226985 | 9/1993 |
| JP | 6205022 | 7/1994 |
| JP | 11145886 | 5/1999 |
| WO | WO 92/03002 | 2/1992 |

OTHER PUBLICATIONS

Tzannes and Tzannes, "Bit–by–Bit Channel Coding Using Wavelets". Proceedings of the Global Telecommunications Conference (GLOBECOM), IEEE; 2: 684–688 (Dec. 6, 1992).

Wong et. al., "Wavelet Packet Division Multiplexing and Wavelet PacketDesign Under Timing Error Effects", IEEE Transactions on Signal Processing; 43 (12): 2877–2890 (Dec. 1997).

Baseband Pulse Transmission.

* cited by examiner

CONSTANT ENVELOPE MODULATION COMMUNICATION SYSTEM

RELATED APPLICATIONS

This application is a division of application Ser. No. 09/469,581 filed Dec. 22, 1999, which claims priority from U.S. Provisional Application No. 60/114,274 filed on Dec. 30, 1998 which is hereby incorporated by reference.

TECHNICAL FIELD OF THE INVENTION

This invention relates to general wireless communication systems, and in particular to continuous phase modulation methods and systems.

BACKGROUND

When transmitting a collection of symbols across a noisy channel, there exists an inherent tradeoff between the power used to transmit each symbol and the length of time or the bandwidth required to transmit the symbol. This tradeoff is shown graphically in the communication efficiency plane of FIG. 1, in which the horizontal axis is the ratio of energy-per-bit to noise power spectral density, $E_b/N_o$, and the vertical axis is the ratio of the communication rate to bandwidth (bits/sec/Hz). The Shannon limit represents the theoretical maximum capacity of the channel to transfer data as, $E_b/N_o$, varies. It is apparent from inspection of FIG. 1 that as more power is used to transmit information, information can be communicated across a channel more rapidly.

The somewhat abstract tradeoff illustrated in FIG. 1 can immediately be understood by considering the case of a speaker attempting to communicate information, for example a telephone number, to a listener across a noisy room. One approach in such a case is for the speaker to shout, thereby rendering the numbers clearly audible to the listener over the noise in the room. Using this method, the speaker can communicate the entire telephone number in a very short time.

Another, far more subtle, approach is for the speaker to speak in a whisper but to elongate the delivery of each syllable. When the speaker transmits the message using this method, the listener can generally pick out the underlying drone of the speaker's message from the background noise, in effect filtering out the speaker's message by integrating the received signal and noise over a sufficiently long integration interval. The disadvantage of this second approach is that it requires considerably more time to transmit the entire telephone number across the room.

In the context of FIG. 1, the speaker who shouts the phone number across the room operates toward the right-hand side of the communication efficiency plane. As a result, that speaker will be able to operate at a high baud rate and to therefore transmit the entire number very quickly. In contrast, the speaker who whispers the phone number operates toward the left-hand side of the communication efficiency plane and is therefore constrained by the Shannon limit to operate at a low baud rate and to therefore transmit the entire number slowly.

Every communication system can be characterized by an operating point in the communication efficiency plane of FIG. 1. One goal of communication systems design is to place that operating point as close as possible to the Shannon limit. Where bandwidth is a limited resource, one can approach the Shannon limit using a high power system. Such a system does not require large bandwidth for near-error free transmission. Conversely, where power is a limited resource, one can approach the Shannon limit by using a low power system operating over a large bandwidth.

In a wireless communication system, the availability of power directed toward the receiver is limited by the transmitter's power rating and antenna gain. The availability of bandwidth is constrained by the desirability of sharing the available spectrum with as many channels as possible and by FCC governmental and international regulations. Consequently, in a wireless communication system, both power and bandwidth are limited resources.

In addition, a communication system in which different symbols are modulated onto the carrier as different power levels will have certain symbols represented by the lowest power level. Because these symbols are transmitted at lower than average power levels, they will inevitably be more prone to corruption by noise than symbols represented by higher than average power levels. As a result, the error rate associated with the transmission of a message will depend on the content of that message. A higher average power will be required for these symbols to reduce the error rate to a desired level.

Constant power signals are preferred for many wireless systems such as satellite communication systems which typically use more efficient class C operating amplifiers. Because these are non-linear amplifiers that operate at or beyond saturation, a waveform having other than constant amplitude can experience profound distortion as it passes through such an amplifier.

Constant power transmission can be achieved by modulating either the frequency or the phase of a carrier wave. Of these two modulation alternatives, phase modulation is far preferable for satellite communication systems because of its greater bandwidth efficiency. The reason for this greater bandwidth efficiency can be readily understood by considering the operation of a frequency modulation system.

In a frequency modulation system such as frequency shift keying (FSK), each symbol corresponds to a particular frequency. When two symbols correspond to two frequencies that are very close together, the probability of a demodulation error due to noise in the communication channel is high. In order to reduce the probability of such an error, the difference of the two frequencies must exceed a certain fixed amount that is proportional to the channel bandwidth. An increase in the signaling rate entails an increase in the number of frequencies employed. This, of course, consumes bandwidth.

In a conventional phase modulation system, each symbol corresponds to a particular phase angle associated with a carrier having a single frequency. As a result, a large number of symbols can be transmitted without requiring multiple frequencies. Phase modulation systems are thus particularly desirable in applications such as satellite communication systems in which bandwidth is at a premium.

In its simplest form, a phase modulation system operates by transmitting a carrier having a fixed phase angle which is representative of a first symbol during a first time interval. In the context of this application, the "phase angle" of a carrier refers to the principal branch of the arc tangent of the ratio of the imaginary part of the carrier to the real part of the carrier. During a second time interval, the system transmits the carrier but with a fixed phase angle corresponding to a second symbol (not necessarily different from the first symbol). The system then operates at the second phase angle for the duration of the second time interval. The system continues to operate in the foregoing manner until all the symbols that make up the message have been sent. The phase considered as a function of time (hereinafter referred to as the "phaseform") for this system thus traces a discontinuous path in time as shown in the phase cylinder in FIG. 2.

A disadvantage of the foregoing method of operating a phase modulation system is that it is not possible to efficiently shape the phaseform so that spectral energy will remain concentrated within the allocated bandwidth while maintaining signaling rate. For systems that employ non-overlapping phase symbols, the symbols are typically phases that are held constant during each symbol transmission interval. For instance, PSK employs constant phase symbols.

Unfortunately, phaseform symbols that have constant values introduce discontinuities whenever a symbol is followed by a different one, and the discontinuity causes energy to spill into adjacent channels, causing adjacent channel interference. If the duration of each of the successive non-overlapping symbols is increased to allow shaping for improved energy concentration and decreased adjacent channel interference, then the signaling rate is decreased.

Another approach to overcoming the foregoing disadvantage is to increase the time interval required to transmit a particular symbol but to also allow portions of two or more symbols to be transmitted during each time interval. This type of phase modulation is best understood with reference to FIG. 3, which shows the transmission of six symbols, each represented by a particular phase angle on the vertical axis, and each of which requires three time intervals, ΔT, for transmission.

As shown in FIG. 3, transmission of the first symbol begins at t=0. At the end of the first clock period, t=ΔT (ΔT=1 clock period) before the first symbol can be completely transmitted, transmission of the second symbol begins. At the end of the second clock period t=2ΔT, before either the first or second symbol can be completely transmitted, transmission of the third symbol begins. Thus, during the third clock period (between t=2ΔT and t=3ΔT), three symbols are concurrently being transmitted. Since no more than three symbols are transmitted concurrently, a phase modulation system operating as shown in FIG. 3 is said to have a "modulation latency" of three.

It is apparent from FIG. 3 that a phase modulation system having a high latency can, after an initial latency interval of duration equal to the duration of the first symbol, transmit a set of symbols at the same rate as a phase modulation system having a latency of one, notwithstanding the fact that each individual symbol may take longer to transmit. What is less apparent is that the transmission of overlapping symbols in the manner shown in FIG. 3 can be made to eliminate the discontinuities shown in the phase cylinder of FIG. 2 by selecting the phasefom symbols to vary continuously with time. If the individual symbols are continuous, and if the boundaries between adjacent symbols are also continuous, then every linear combination of such symbols overlapped arbitrarily in time will also be continuous. Since it is the discontinuities in the phaseform that result in the spray of high-frequency energy into adjacent channels, phase modulation as shown in FIG. 3 (often referred to as "continuous phase modulation") tends to better confine the signal energy into its allocated bandwidth.

Because energy from two or more overlapping phaseform symbols is commingled, known demodulators cannot readily separate the energy associated with any particular phaseform symbol. In these types of systems, referred to as "partial response" systems, there is less energy per symbol available to the demodulator. In order to compensate for this reduced symbol energy, sequence demodulators, such as Viterbi decoders, are used to recover the symbols. Unfortunately, the use of such sequence demodulators imposes computational costs that increase exponentially with the number of symbols concurrently processed by the demodulator to retrieve the current symbol.

It is known that, in theory, one can separate the individual overlapping symbols that constitute a phaseform if the phaseform is a linear combination of time-shifted sinc functions (sinc (x)=sin (x)/x) if the coefficients of the shifted sinc functions are known functions of the information symbols. Because the temporally shifted sinc functions are orthogonal to one another, it is theoretically possible to recover all the energy associated with a particular symbol, and hence achieve "full response" demodulation, by demodulating the phaseform using a matched filter corresponding to the sinc function associated with that symbol. However, this procedure is physically unrealizable because the sinc function has infinite duration.

It is therefore desirable to provide systems and methods for achieving physically-realizable full-response continuous phase modulation.

SUMMARY OF THE INVENTION

In a communication system and method according to the invention, a sequence of information symbols is encoded as a phase trajectory (herein referred to as a phaseform) of a phase-modulated carrier, thereby generating a phase-modulated signal. This phase-modulated signal is representative of a selected symbol transmitted during a selected-symbol transmission interval, and at least two symbols concurrently being transmitted during that interval. The phaseform of the phase-modulated signal is generated by evaluating a combination of transmitting-filter responses having finite duration. The foregoing combination of transmitting-filter responses includes a selected transmitting-filter response weighted by the selected symbol.

Recovery of the selected symbol is accomplished at a receiver by first demodulating the phase-modulated signal to obtain the phaseform. The receiver then filters the phaseform with a receiving-filter response corresponding to the selected transmitting-filter response. This results in a weighted output representative of the combination of transmitting-filter responses weighted by the receiving-filter response. Finally, the receiver accumulates the values of the weighted output over the transmitting interval. This accumulation process can be implemented by an integrator, for an analog system implementation, or alternatively, by a summer, for a digital system implementation. The result of the accumulation process is a signal representative of the selected symbol separated from the at least two overlapping symbols transmitted concurrently.

The receiving filter-responses may be selected to be shift-biorthogonal to the transmitting-filter responses. In the case in which the receiving-filter response is the same as the corresponding transmitter-filter response, the shift-biorthogonal receiving-filter responses will be shift-orthogonal and the transmitter-filter and corresponding receiver-filter will be a matched filter pair. The result in either case is that the accumulation of the values of the weighted output over the transmitting interval nulls or cancels constituents of the weighted output that correspond to symbols other than the selected symbol. The result of the accumulation process is thus a signal representative of the selected symbol alone. In this way, the communication system and method of the invention separates the selected symbol from among the commingled symbols present in the phaseform.

The operation of the communication system and method of the invention does not rely on the nature of the signal and can be implemented in conjunction with analog or digital carriers and with analog or digital phaseforms. What is important is that the transmitting-filter functions and the receiving-filter functions be selected so that phaseform constituents corresponding to symbols other than the symbol of interest can be eliminated by an accumulation process.

In a second embodiment of the communication system and method of the invention, a symbol to be recovered and at least two other symbols are transmitted concurrently. This second embodiment is identical to the first embodiment with the exception that the receiving-filter function is selected to have the additional property of being matched, or shift-orthogonal, to the transmitting-filter function.

The foregoing and other objects, features and advantages of the invention will be apparent from the following description and the accompanying drawings, in which:

DETAILED DESCRIPTION

Figure 1:
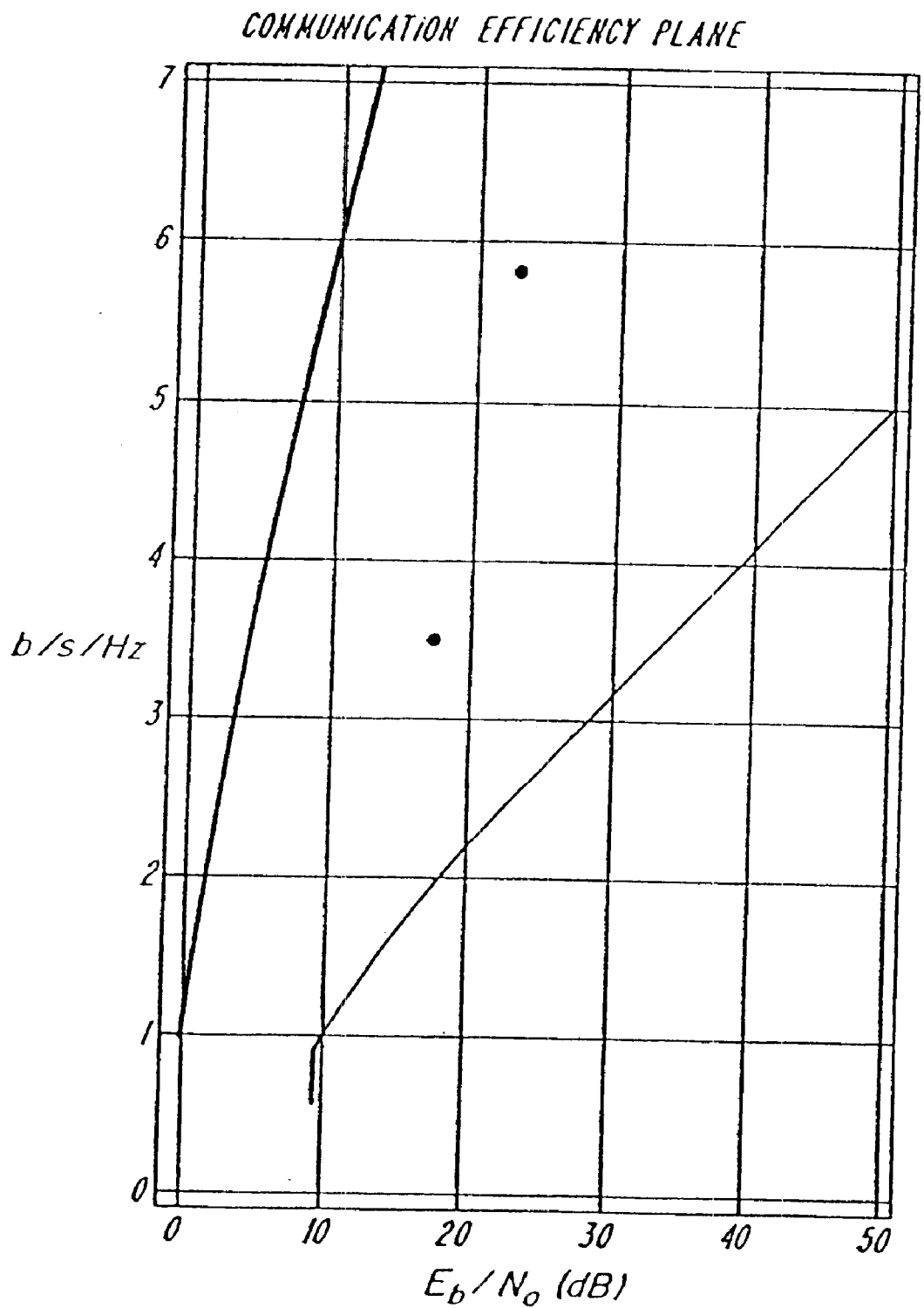
FIG. 1 shows the Shannon limit on the bandwidth efficiency plane.
Figure 2:
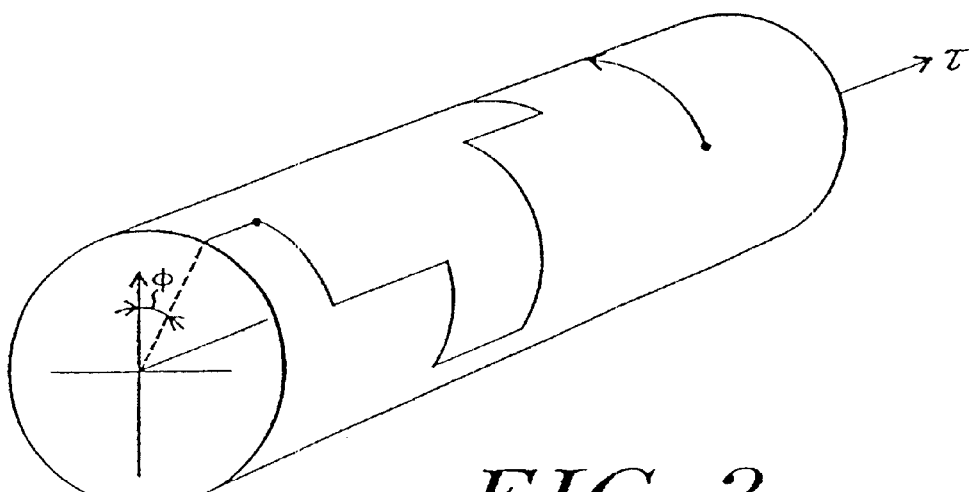
FIG. 2 shows a complex baseband representation of a phase cylinder on which is traced a discontinuous phaseform from a conventional phase modulation system.
Figure 3:
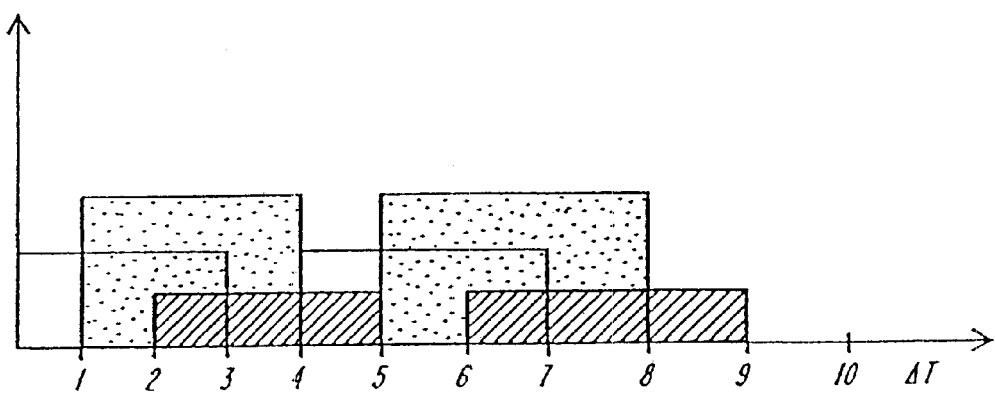
FIG. 3 illustrates the concept of modulation latency by showing the transmission of six symbols, each of which requires three clock periods for complete transmission.
Figure 4:
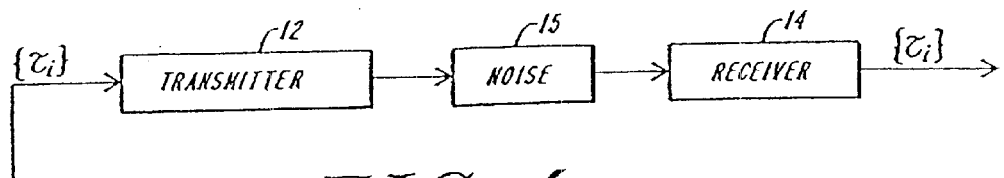
FIG. 4 shows a general communication system incorporating the principles of the invention.

With reference to FIG. 4, a communication system 10 incorporating the principles of the invention includes a transmitter 12 and a receiver 14 separated by a communication channel, represented in FIG. 4 by a noise source 15.

In a communication system 10 according to the invention, the transmitter 12 forms and transmits a phase-modulated wave having a phaseform in which are encoded a sequence of symbols. At successive instants of time separated by a clock period having a duration of $\Delta T$ seconds, the transmitter begins sending a new information symbol. Each symbol requires g clock periods for transmission. Hence g is referred to as the "modulation latency," or simply the "latency" of the system. At any instant, the phaseform can represent as many symbols as the modulation latency of the system. The receiver 14 then demodulates the phase-modulated wave and recovers the symbols encoded in the phaseform.

To facilitate exposition and understanding of the structure and operation of the communication system 10, the structure and operation of the transmitter 12 and receiver 14 are discussed with reference to separate sets of figures. The structure and operation of the transmitter 16 is discussed with reference to FIGS. 5–7. The structure and operation of the receiver 14 is discussed with reference to FIG. 8–10.

Transmitter

Figure 5:
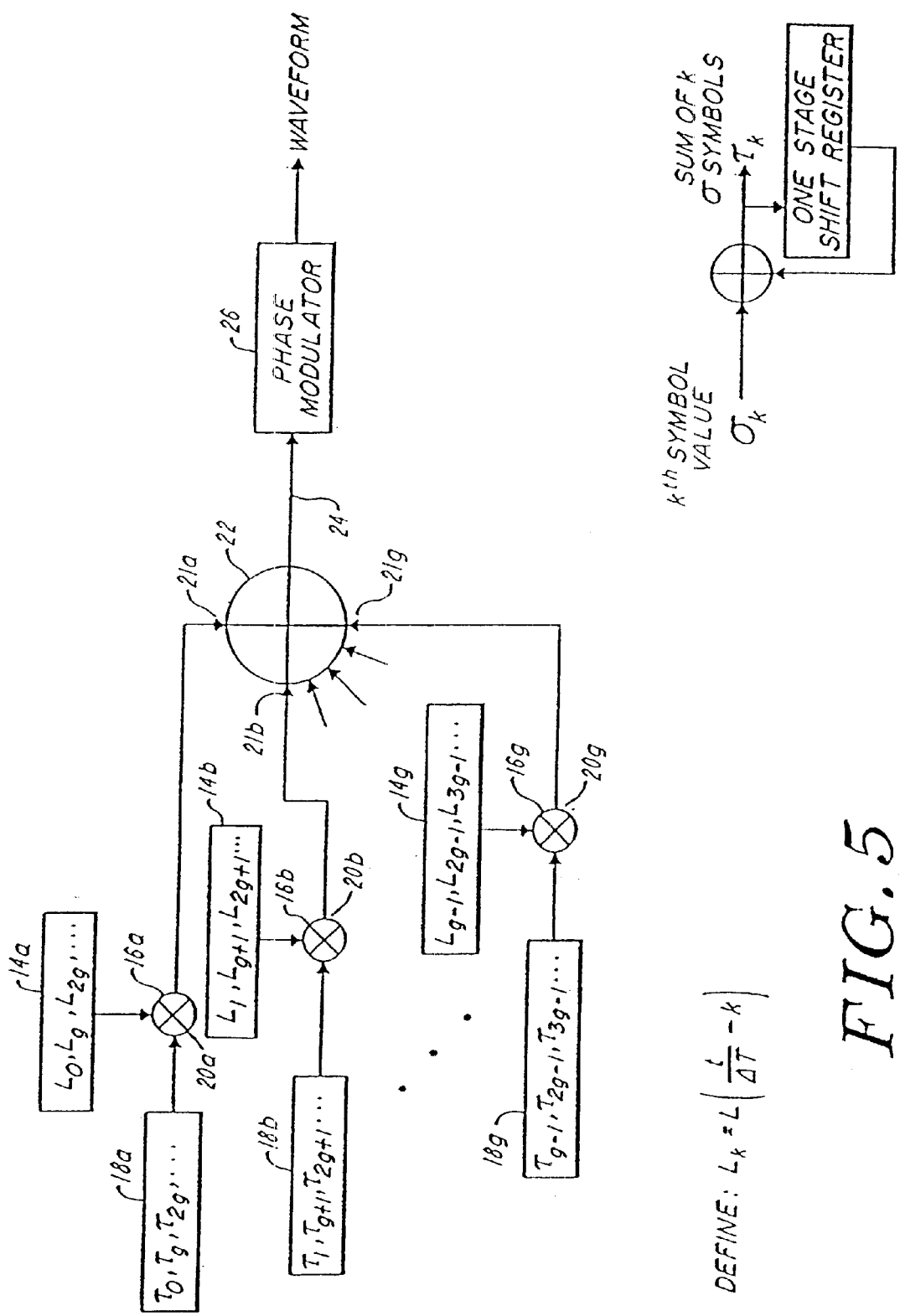
FIG. 5 shows the components of the transmitter shown in FIG. 4.

Referring to FIG. 5, the transmitter 12 incorporating the subject matter of the invention includes a plurality of transmitting shift-biorthogonal function generators 14a–g and a plurality of transmitting mixers 16a–g. The number of such transmitting shift-biorthogonal function generators 14a–g and the number of such transmitting mixers 16a–g is at least equal to the modulation latency, g. An input binary digital information stream is transformed into a stream of numerical information symbols $\tau_0, \tau_1, \tau_2, \ldots \tau_{L-1}$. These numerical values are transmitted by the transmitter 12, and will be recovered by a receiver, to be described below in connection with FIG. 8. A post-processing operation reconverts the numerical symbols into a binary digital information stream.

The input symbol stream $\tau_0, \tau_1, \tau_2, \ldots \tau_{L-1}$ is demultiplexed into a plurality of demultiplexed streams 18a–g, each of which is directed to a corresponding transmitting mixer 16a–g. The first symbol, $\tau_0$ from the first demultiplexed stream 18a is presented to the first mixer 16a. The resulting output 20a from the first mixer 14a is $\tau_0 L_0$. One symbol start period $\Delta T$ later, the second symbol $\tau_1$, from the second demultiplexed stream 18b, is presented to the second mixer 16b. This procedure continues until the $g^{th}$ symbol, $\tau_{g-1}$ is presented to the $g^{th}$ transmitting mixer 16g. The process repeats with the $(g+1)^{th}$ symbol, $\tau_g$ from the first demultiplexed stream 18a being presented to the input of the first mixer 16a. The resultant mixer outputs 20a–g of these transmitting mixers 16a–g are (g) signals that are representative of a filtered symbol. The transmitting-mixer outputs 20a–g are connected to a corresponding number of inputs 21a–g of a transmitting accumulator 22. The transmitting accumulator 22 has a transmitting-accumulator output 24 on which it provides a signal representative of the sum of the overlapping filtered symbols. A phase modulator 26 then encodes the signal present on the transmitting-accumulator output 24 onto the phase of a carrier wave. This carrier wave, with its phase now modulated by the signal present on the accumulator output 24, then enters the communication channel 15.

Figure 7:
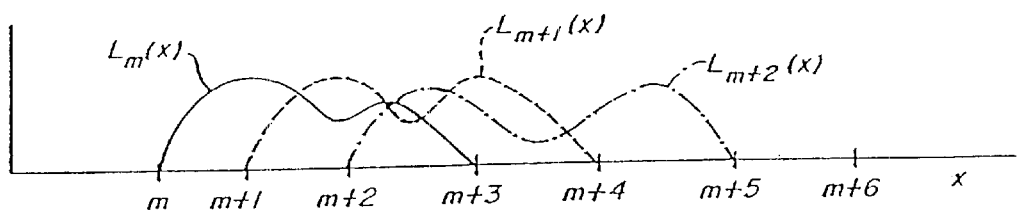
FIG. 7 shows representative filter functions for the communication system of FIG. 1 in which the modulation latency is 3.
Figure 6:
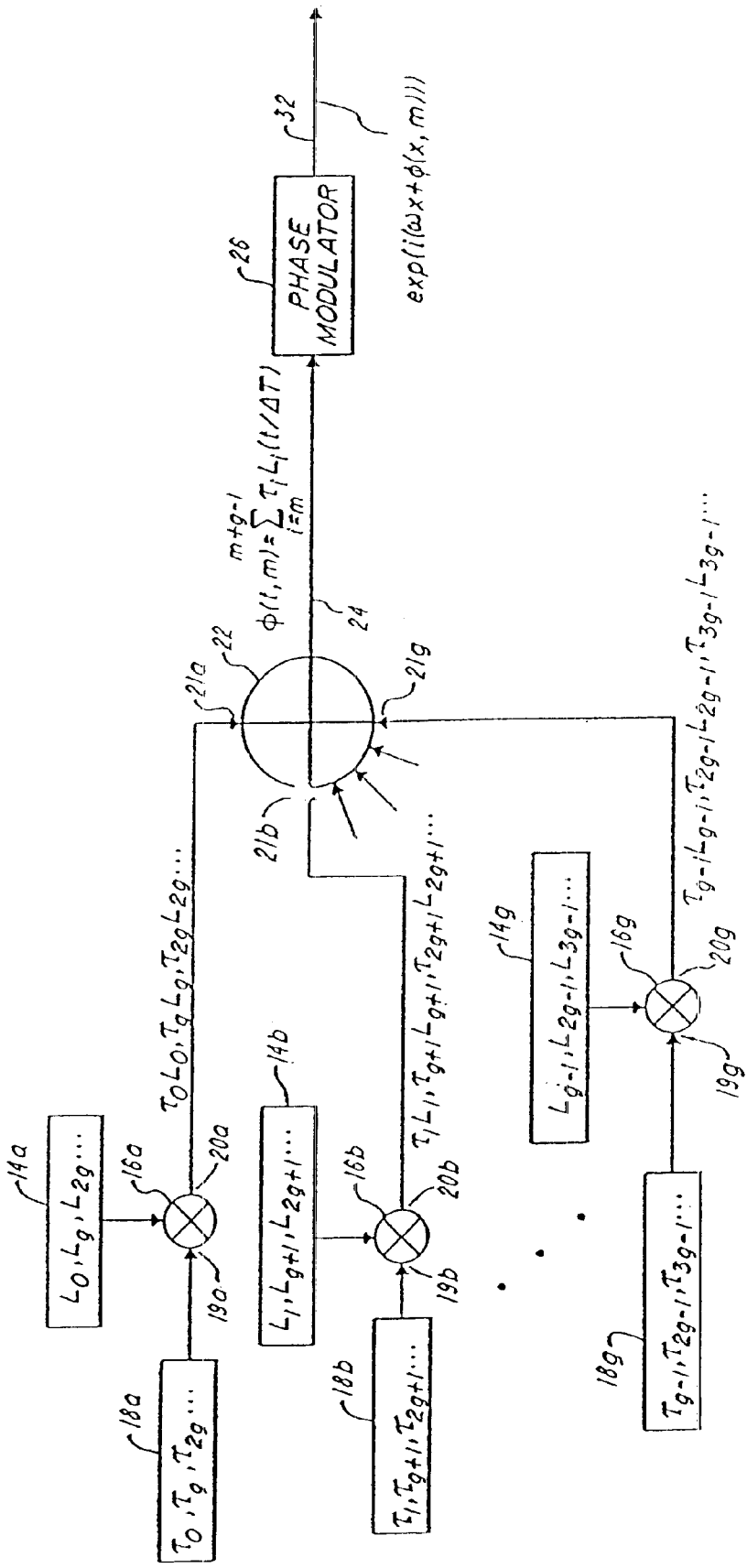
FIG. 6 shows the signals present at various points within the transmitter of FIG. 5 after m clock periods have elapsed.

FIG. 6 shows the signals present on the various inputs and outputs of the transmitter 12 of FIG. 5 after m clock periods have elapsed. The g symbols $\tau_k$ for k=m, m+1, . . . , m+g−1, which are a known numerical function of the information bits in the message to be transmitted, being transmitted in clock period m+1, namely symbols $\tau_m, \tau_{m+1}, \ldots, \tau_{m+g-1}$, are presented at the symbol inputs 19a–g of the transmitting mixers 16a–g. The transmitting-filter generators 14a–g then generate corresponding transmitting-filter functions $L_m(x), L_{m+1}(x), \ldots, L_{m+g-1}(x)$. These transmitting-filter functions are presented at the filter inputs 18a–g of the corresponding transmitting mixers 16a–g. These transmitting-filter functions, representative examples of which are shown in FIG. 7, are preferably chosen to be temporally-shifted shift-biorthogonal wavelet basis functions having compact support. Each mixer 16a–g mixes a transmitting-filter function with a corresponding symbol. The output of each transmitting mixer 16a–g is thus a shift-biorthogonal wavelet function having an amplitude weighted by a corresponding symbol being transmitted: $\tau_i L_i(x)$.

Those skilled in the art will recognize that the transmitting-filter generators 14*a*–*g* and the transmitting mixers can be implemented directly in hardware or by suitable software instructions provided to a computer system.

For simplicity of notation, hereinafter let $x=t/\Delta T$. In FIG. 7, each transmitting-filter function $L_i(x)$ is preferably shifted in time (x) so that it is non-zero only during clock periods during which its corresponding symbol $\tau_i$ is being transmitted. Since it takes g clock periods to transmit a given symbol, each transmitting-filter function is non-zero for only g clock periods. For the filter functions shown in FIG. 7, the modulation latency is three. Hence, $L_m(x)$ is non-zero only during clock periods between $t=m\Delta T$ and $t=(m+3)\Delta T$. Similarly, $L_{m+1}(x)$ is non-zero only during those clock periods between $t=(m+1)\Delta T$ and $t=(m+4)\Delta T$.

As shown in FIG. 6, the transmitting-accumulator 22 provides, at the transmitting-accumulator output 24, a phaseform representative of a weighted sum of shifted wavelet basis functions:

$$\phi(x,m) = \sum_{i=m}^{m+g-1} \tau_i L_i(x)$$

The phase modulator 26 then encodes the signal from the transmitting-accumulator output 24 onto a carrier $\exp(i\omega x)$. The signal present at the output 32 of the phase modulator 26 is thus a wave having a time-varying phase modulated by a sum of weighted and temporally-shifted wavelet basis functions corresponding to those symbols that are currently being transmitted:

$$\exp(i(\omega x + \phi(x,m)))$$

Consideration of FIGS. 5–7 reveals that a transmitter 12 operating according to the principles of the invention begins transmitting a new symbol with each clock interval. Since the transmission of each symbol requires several clock intervals, during any clock interval, there can be several symbols being transmitted, each at a different stage of transmission. The transmitter 12 weights each symbol by mixing it with a transmitting-filter function which is non-zero only during those clock periods in which the symbol is being transmitted. The transmitter 12 then evaluates a sum over the clock periods during which the transmitting-filter functions are non-zero. This sum, or integral, is then used to modulate the phase of a carrier wave.

Receiver

Figure 8:
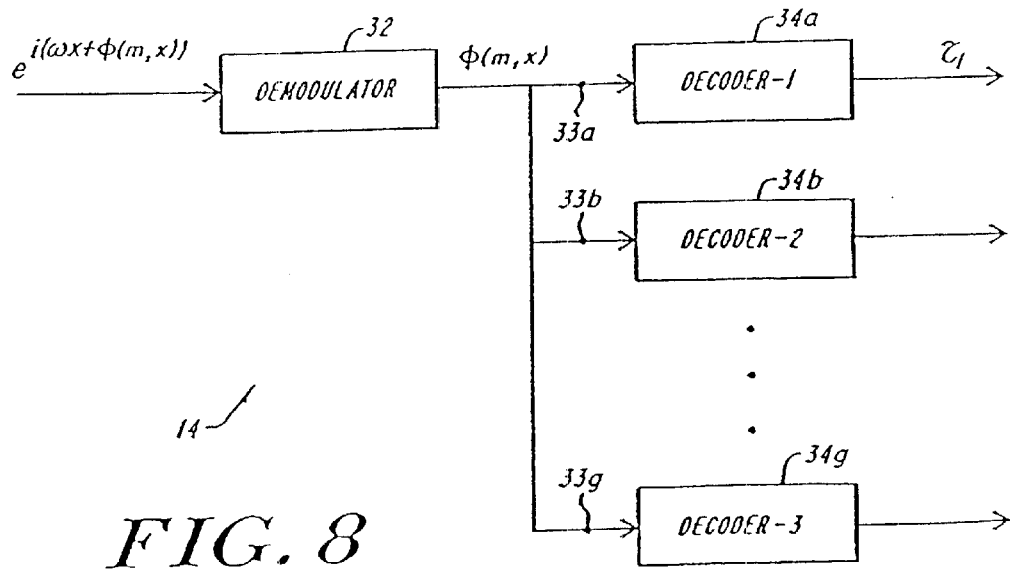
FIG. 8 shows the architecture of the receiver shown in FIG. 4.

Referring now to FIG. 8, the receiver 14 incorporating the principles of the invention includes a phase demodulator 32 for recovering the phaseform $$\phi(x,m) = \sum_{i=m}^{m+g-1} \tau_i L_i(x)$$

from the phase-modulated signal. The process of recovering the phaseform can include conventional signal processing techniques for noise-suppression. These functions are accomplished by known subsystems within the phase demodulator 32.

The phase demodulator 32 is connected to phaseform inputs 33*a*–*g* of each of a plurality of symbol decoders 34*a*–*g*. The phaseform provided to each symbol decoder 34*a*–*g* is thus a finite sum of phase terms, each of which is a temporally-shifted wavelet basis function weighted by one of the symbols being transmitted. The purpose of each symbol decoder 34*a*–*g* is to separate one of these constituent phase terms from the phaseform. The output of each symbol decoder 34*a*–*g* is thus the symbol associated with one of the constituent phase terms in the above phaseform. Since the number of phase terms, and hence the number of symbols, present in the phaseform at any instant is no greater than the modulation latency, the number of symbol decoders 34*a*–*g* need be no greater than the modulation latency.

The observant reader will note that in FIG. 8, only the first symbol decoder 34*a* is shown as having an output. This is meant to suggest that not all the symbol decoders have their outputs ready at the same time. The reason this is so is that each symbol takes several clock intervals to transmit. Thus, if the transmitter were to begin transmitting symbol $\tau_i$ before beginning the transmitting symbol $\tau_{i+1}$, one would expect that the symbol decoder charged with extracting symbol $\tau_i$ would complete its extraction process before the symbol decoder charged with extracting symbol $\tau_{i+1}$ could complete its extraction process.

Figure 9:
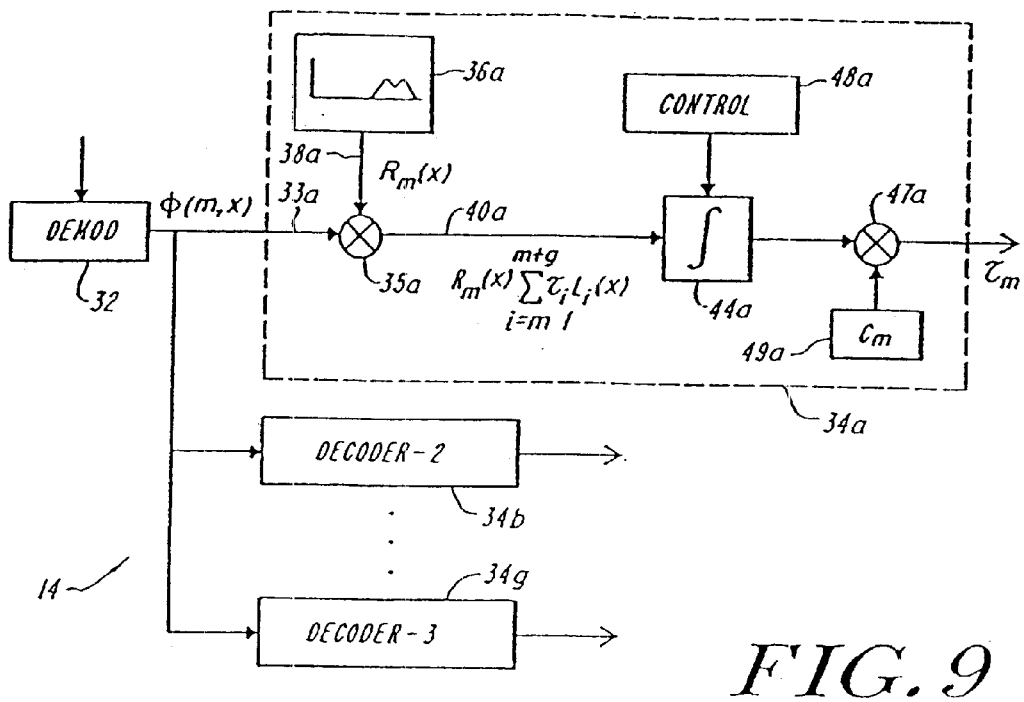
FIG. 9 shows the architecture of one symbol decoder shown in FIG. 8.

Because the symbol decoders 34*a*–*g* all operate in fundamentally the same manner, it is instructive to consider in detail the operation of a first symbol decoder 34*a*, shown in detail in FIG. 9.

Those skilled in the art will recognize that the illustrated demodulator 32 and symbol decoders 34*a*–*g* can be implemented directly in hardware or by suitable software instructions provided to a computer system.

Referring now to FIG. 9, the first symbol decoder 34*a* includes a receiving mixer 35*a* and a receiving-filter generator 36*a*. The receiving mixer 35*a* has a phaseform terminal 33*a* connected to the phase demodulator 32, a receiving-filter input terminal 38*a* connected to the receiving-filter generator 36*a*, and a receiving-mixer output terminal 40*a*.

In operation, the receiving-filter generator 36*a* generates and places a receiving-filter function $R_m(x)$ at the receiving-filter input terminal 38*a* of the receiving mixer 35*a*. The signal leaving the receiving mixer 35*a* is thus $$R_m(x) \sum_{i=m}^{m+g-1} \tau_i L_i(x) = \tau_m R_m(x) L_m(x) + \tau_{m+1} R_m(x) L_{m+1}(x) + \ldots + \tau_{m+g-1} R_m(x) L_{m+g-1}(x)$$

where $x=t/\Delta T$ is as described in connection with the discussion of the transmitter. The receiving-filter function $R_m(x)$ is selected such that the integral of the product $R_m(x)L_n(x)$ is non-zero only when $n=m$. Consequently, in order to extract the symbol $\tau_m$ from the signal present at the receiving-filter input terminal 33*a*, one need only integrate over an appropriate time interval. Since each of the $L_i(x)$ have compact support, it follows that each term in the above sum, and hence the sum itself, is non-zero over a finite interval. It is this finite interval that is the appropriate time interval for integration.

Filter pairs having the foregoing property can be shift bi-orthogonal filter pairs for which $$\int R(x)L(x-n)dx = \begin{cases} 0 & \text{if } n \neq 0 \\ c, c \neq 0 & \text{if } n = 0 \end{cases}$$

or shift-orthonormal filters for which $$\int R(x)L(x-n)dx = \begin{cases} 0 & \text{if } n \neq 0 \\ 1 & \text{if } n = 0 \end{cases}$$

Alternatively, filter pairs suitable for use in the method and system of the invention can be bi-orthogonal filters which are defined as having the additional properties:

$$\int R(x)dx = 1$$

and $$\int L(x)dx = 1$$

In the case in which $R(x)=L(x)$, the transmitter and receiver filters are matched filters.

The signal present leaving the receiving mixer 35a is made available to a signal input terminal of a receiving accumulator 44a. In addition to a signal input terminal, the receiving accumulator 44a includes: a receiving-accumulator output terminal 46a on which is placed an accumulated quantity; and an associated controller 48a for providing control signals to the receiving accumulator 44a. These control signals specify when to begin accumulation, how long accumulation is to occur, and when to place the accumulated quantity on the receiving-accumulator output terminal 46a.

The receiving accumulator 44a can act as a summer or integrator, depending on whether the communication system 10 is an analog or digital communication system. The associated controller 48a selects the appropriate time interval for integrating or summing the signal present at the signal input terminal. The receiving accumulator 44a and its associated controller 48a thus cooperate to place on the receiving accumulator output terminal 46a a signal representative of a sum or integral over a finite and selected time interval.

In order to recover a particular symbol, the receiving accumulator 44a begins the integration process when the phase term corresponding to that symbol first becomes one of the constituents of the phaseform. The integration process carried out by the receiving accumulator 44a continues throughout the interval during which the phase term corresponding to that symbol remains one of the constituents of the phaseform. Once the phaseform no longer has, as one of its constituents, the phase term corresponding to the particular symbol, the integration process ceases and the phase term corresponding that symbol is made available at the receiving accumulator output terminal 46a.

Depending on the choice of receiving filter function and transmitting-filter function, the signal at the receiving-accumulator output terminal 46a may need to be scaled. This is readily accomplished by feeding that signal into a multiplier 47a and scaling it by a suitable constant available in a scaling register 49a. The value stored in the scaling register 49a can be pre-selected or can be obtained from a look-up table.

With the exception of differences in the filter functions generated by the receiving-filter generator 36a and in the start and stop times for accumulation as provided by the receiving accumulator controller 48a, the remaining symbol decoders 34b–g operate in the same manner as the first symbol decoder 34a.

Figure 10:
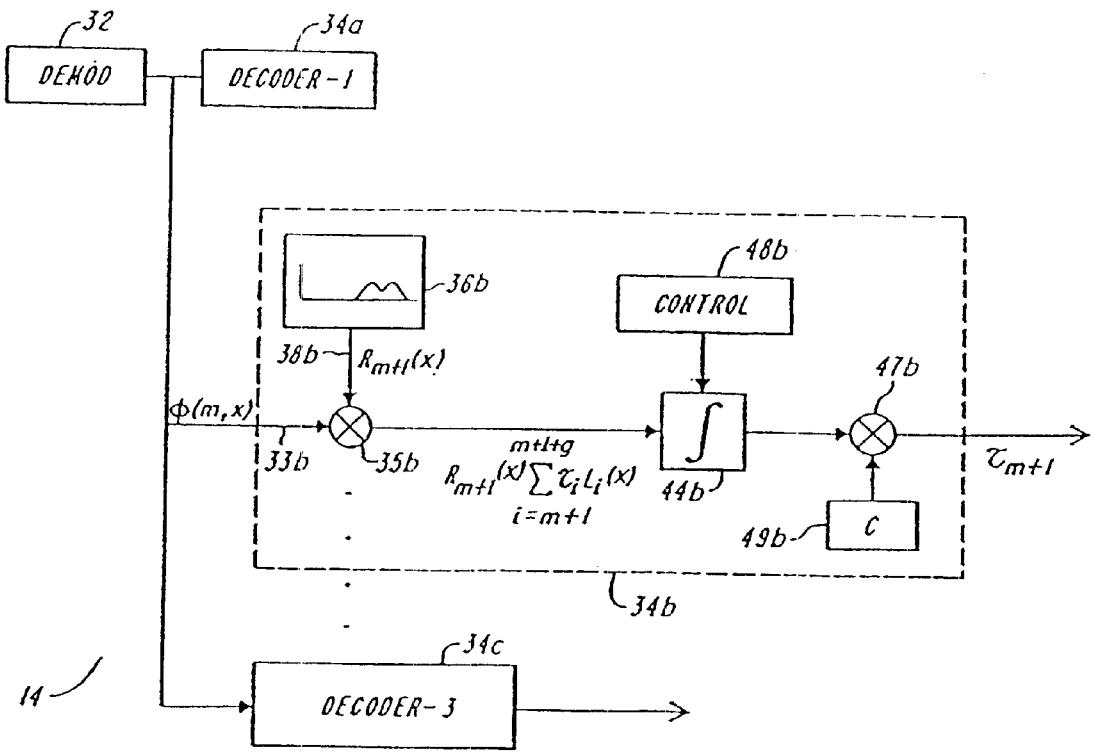
FIG. 10 shows the architecture of a second symbol decoder shown in FIG. 8.

As shown in FIG. 10, the second symbol decoder 34b, like the first symbol decoder 34a, includes a receiving mixer 35b and a receiving-filter generator 36b. The receiving mixer 35b has a phaseform terminal 33b connected to the phase demodulator 32, a receiving-filter input terminal 38b connected to the receiving-filter generator 36b, and a receiving-mixer output terminal 40b.

In operation, the receiving-filter generator 36b places a different receiving-filter function $R_{m+1}(x)$ at the receiving-filter input terminal 38b of the receiving mixer 34b. The signal present at the output terminal is thus $$R_{m+1}(x)\sum_{i=m+1}^{m+g}\tau_i L_i(x) = \tau_{m+1}R_{m+1}(x)L_{m+1}(x) +$$
$$\tau_{m+2}R_{m+1}(x)L_{m+2}(x) + \ldots +$$
$$\tau_{m+g+1}R_{m+1}(x)L_{m+g}(x)$$

The receiving-filter function $R_{m+1}(x)$ for the second symbol decoder 34b is likewise selected such that the integral of the product $R_{m+1}(x)L_n(x)$ is non-zero only when $n=m+1$. The receiving-filter function can be a time shifted version of $R_m(x)$, however any function satisfying the foregoing condition is suitable. Consequently, in order to extract the symbol $\tau_{m+1}$ from the signal present at the receiving-filter input terminal 33b, one need only integrate over an appropriate time interval. Since each of the $L_i(x)$ have compact support, it follows that each term in the above sum, and hence the sum itself, is non-zero over a finite interval. It is again this finite time interval that is the appropriate interval for integration. However, the start time and stop time for this finite time interval are different from those used in the first symbol decoder 34a.

As was the case in the first symbol decoder 34a, the signal leaving the receiving mixer 35b is made available to a signal input terminal of a receiving accumulator 44b. In addition to a signal input terminal, the receiving accumulator 44b includes: a receiving-accumulator output terminal 46b on which is placed an accumulated quantity; and an associated controller 48b for providing control signals to the receiving accumulator 44b. These control signals specify when to begin accumulation, how long accumulation is to occur and when to place the accumulated quantity on the receiving-accumulator output terminal 46b.

The receiving accumulator 44b can act as a summer or integrator, depending on whether the communication system 10 is an analog or digital communication system. The associated controller 48b selects the appropriate time interval for integrating or summing the signal present at the signal input terminal. This time interval is typically delayed by one time interval relative to the time interval used in the first symbol decoder 34a. The receiving accumulator 44b and its associated controller 48b thus cooperate to place on the receiving accumulator output terminal 46b a signal representative of a sum or integral over a finite and selected time interval.

In order to recover the symbol $\tau_{m+1}$, the receiving accumulator 44b begins the integration process when the phase term corresponding to $\tau_{m+1}$ first becomes one of the constituents of the phaseform. The integration process carried out by the receiving accumulator 44b continues throughout the interval during which the phase term corresponding to $\tau_{m+1}$ remains one of the constituents of the phaseform. Once the phaseform no longer has, as one of its constituents, the phase term corresponding to $\tau_{m+1}$, the integration process ceases and the phase term corresponding $\tau_{m+1}$ is made available at the receiving-accumulator output terminal 46b.

It will be apparent to those of ordinary skill in the art that the operation of the invention relies upon the judicious choice of filter functions and not on whether the underlying communication system is a digital or analog communication system. Hence, it is intended that the scope of the following claims cover both digital and analog communication systems.

Having described the invention and a preferred embodiment thereof, what is claimed as new and secured by Letters Patent is:

1. A method for modulating a phaseform of a carrier by encoding thereon a first symbol and at least two additional symbols having temporal overlap with the first symbol, said method comprising evaluating a combination of transmitting-filter responses, the combination including a first element formed by weighting a first transmitting-filter response by the first symbol, the first transmitting-filter response selected to correspond to a first receiving-filter response, and modulating the phaseform of the carrier with the combination of transmitting-filter responses, wherein the first symbol is modulated during a clock cycle that is adjacent to a clock cycle associated with the modulation of at least one of the additional symbols.

2. A method according to claim 1, wherein evaluating a combination of transmitting-filter responses includes evaluating a combination of temporally-shifted wavelet functions having compact support.

3. A method according to claim 1, wherein evaluating a combination of transmitting-filter responses includes evaluating a combination of temporally-shifted shift-biorthogonal wavelet basis functions having compact support.

4. A method according to claim 1, further comprising providing the first receiving-filter response based on being at least one of shift-orthogonal, shift-orthonormal, and shift-bi-orthogonal to the first transmitting-filter response.

5. A method according to claim 1, further comprising producing at least the first transmitting-filter response and the corresponding receiving-filter response by matched filters using wavelet basis functions.

6. A method according to claim 1, further comprising producing the receiving-filter response based on a shift-biorthogonal wavelet function.

7. A method for encoding a first symbol and a second symbol on a phase component of a carrier signal, the first symbol being transmitted during a first symbol transmission interval, the second symbol being transmitted during a second symbol transmission interval overlapping the first symbol transmission interval, said method comprising filtering the first symbol with a first transmitting-filter-function in a first interval, thereby generating a first weighted signal, filtering the second symbol with a second transmitting-filter-function in a second interval overlapping the first interval, thereby generating a second weighted signal, generating a modulating quantity on the basis of at least the first weighted signal and the second weighted signal, and modulating the phase component of the carrier signal on the basis of the modulating quantity, wherein the first symbol is modulated during a symbol start period that is adjacent to a symbol start period associated with the modulation of the second symbol.

8. The method of claim 7 wherein generating the modulating quantity comprises summing the first weighted signal and the second weighted signal.

9. The method of claim 7 wherein modulating the phase component of the carrier signal comprises selecting the phase component to be equal to the modulating quantity.

10. A method according to claim 7, wherein modulating the phase component of the carrier signal on the basis of the modulating quantity further comprises modulating the first symbol during a symbol start period that is at least one clock cycle and adjacent to a symbol start period associated with the modulation of the second symbol.

11. A method according to claim 7, wherein filtering the first symbol includes providing at least the first transmitting-filter-function, wherein at least the first transmitting-filter-function is based upon at least one temporally-shifted wavelet function having compact support.

12. A method according to claim 7, wherein filtering the first symbol includes providing at least the first transmitting-filter-function, wherein at least the first transmitting-filter-function is based upon at least one temporally-shifted shift-biorthogonal wavelet basis function having compact support.

13. A transmitter for encoding a first symbol and a second symbol on a phase component of a carrier signal, the first symbol being transmitted during a first symbol transmission interval, the second symbol being transmitted during a second symbol transmission interval overlapping the first symbol transmission interval, the transmitter comprising a first transmitting-filter-response generator for generating a first transmitting-filter-response in a first interval, a first mixer connected to receive the first transmitting-filter-response and the first symbol, thereby generating a first weighted signal, a second transmitting-filter response generator for generating a second transmitting-filter response in a second interval overlapping the first interval, a second mixer connected to receive the second transmitting-filter-response and the second symbol, thereby generating a second weighted signal, a combiner in communication with at least the first mixer and the second mixer for generating a modulating quantity on the basis of at least the first weighted signal and the second weighted signal, and a phase modulator in communication with the combiner for modulating the phase component of the carrier signal on the basis of the modulating quantity, wherein the first symbol is modulated during a symbol start period that is adjacent to a symbol start period associated with the modulation of the second symbol.

14. A transmitter according to claim 13 wherein the combiner is adapted to sum the first weighted signal and the second weighted signal.

15. A transmitter according to claim 13 wherein the phase modulator is adapted to set the phase component of the carrier signal to the modulating quantity.

16. A transmitter according to claim 13 wherein the first and second transmitting-filter-responses generators are adapted to generate first and second transmitting-filter-response that are shift biorthogonal to corresponding first and second receiving-filter responses generated by a receiving-filter generator in a receiver.

17. A transmitter according to claim 13 wherein the first and second transmitting-filter-responses generators are adapted to generate first and second transmitting-filter-response that are shift biorthonormal to corresponding first and second receiving-filter responses generated by a receiving-filter generator in a receiver.

18. A transmitter according to claim 13 wherein the first and second transmitting-filter-responses generators are adapted to generate first and second transmitting-filter-response that are shift orthogonal to corresponding first and second receiving-filter responses generated by a receiving-filter generator in a receiver.

19. A transmitter according to claim 13, wherein the symbol start period is at least one clock cycle.

20. A transmitter according to claim 13, wherein at least one of the first transmitting-filter response and the second transmitting-filter response is based upon at least one temporally-shifted wavelet function having compact support.

21. A transmitter according to claim 13, wherein at least one of the first transmitting-filter response and the second transmitting-filter response is based upon at least one temporally-shifted shift-biorthogonal wavelet function having compact support.

22. A method for modulating a phaseform of a carrier by encoding thereon a first symbol and at least two additional symbols having temporal overlap with the first symbol, said method comprising
    evaluating a combination of transmitting-filter responses, the combination including a first element formed by weighting a first transmitting-filter response by the first symbol, the first transmitting-filter response selected to correspond to a first receiving-filter response, and
    modulating the phaseform of the carrier with the combination of transmitting-filter responses, wherein the first symbol is modulated during a symbol start period that is adjacent to a symbol start period associated with the modulation of at least one of the additional symbols.

23. A method according to claim 22, wherein modulating the phaseform of the carrier with the combination of transmitting-filter responses further comprises modulating the first symbol during a symbol start period that is at least one clock cycle and adjacent to a symbol start period associated with the modulation of at least one of the additional symbols.

24. A method according to claim 22, wherein evaluating a combination of transmitting-filter responses includes evaluating a combination of temporally-shifted wavelet functions having compact support.

25. A method according to claim 22, wherein evaluating a combination of transmitting-filter responses includes evaluating a combination of temporally-shifted shift-biorthogonal wavelet basis functions having compact support.

26. A method according to claim 22, further comprising providing the first receiving-filter response based on being at least one of shift-orthogonal, shift-orthonormal, and shift-bi-orthogonal to the first transmitting-filter response.

27. A method according to claim 22, further comprising producing at least the first transmitting-filter response and the corresponding receiving-filter response by matched filters using wavelet basis functions.

28. A method according to claim 22, further comprising producing the receiving-filter response based on a shift-biorthogonal wavelet function.

29. A method for combining temporally overlapped symbols, comprising,
    providing transmitting-filter responses,
    generating weighted signals by filtering the temporally overlapped symbols with the transmitting-filter responses, and,
    combining the weighted signals throughout consecutive symbol start periods, where a symbol start period is at least one clock cycle.

30. A method according to claim 29, further comprising, modulating a phase component of a carrier signal based on the combined weighted signals.

31. A method according to claim 29, wherein combining the weighted signals further comprises accumulating the weighted signals.

32. A method according to claim 29, wherein providing transmitting-filter responses further comprises providing analog transmitting-filter responses.

33. A method according to claim 29, wherein providing transmitting-filter responses further comprises providing digital transmitting-filter responses.

34. A method according to claim 29, wherein providing transmitting-filter responses further includes providing temporally-shifted wavelet basis functions having compact support.

35. A method according to claim 29, wherein providing transmitting-filter responses further includes providing temporally-shifted shift-biorthogonal wavelet basis functions having compact support.

36. A method for communicating symbols during consecutive symbol start periods to cause a temporal overlap of symbols during symbol transmission intervals, the method comprising,
    providing transmitting-filter responses,
    generating weighted signals by filtering the temporally overlapped symbols with respective transmitting-filter responses,
    accumulating the weighted signals based on the temporally overlapped symbols,
    transmitting a carrier signal having a phase component modulated by the accumulated signal,
    providing receiving-filter responses matched to the transmitting-filter responses,
    filtering a demodulated phase component of a received signal with the receiving-filter responses to generate a weighted output representative of the transmitting-filter responses, and,
    accumulating the weighted outputs during symbol transmission intervals to provide a signal representative of a transmitted symbol,
    where a symbol start period is at least one clock cycle.

37. A method according to claim 36, wherein providing receiving-filter responses matched to the transmitting-filter responses, further includes providing receiving-filter responses shift-orthonormal to the transmitting-filter responses.

38. A method according to claim 36, wherein providing receiving-filter responses matched to the transmitting-filter responses, further includes providing receiving-filter responses shift-orthogonal to the transmitting-filter responses.

39. A method according to claim 36, wherein providing receiving-filter responses matched to the transmitting-filter responses, further includes providing receiving-filter responses shift-biorthogonal to the transmitting-filter responses.

40. A method according to claim 36, wherein accumulating the weighted outputs further comprises integrating the weighted outputs.

41. A method according to claim 36, wherein providing transmitting-filter responses further comprises providing analog transmitting-filter responses.

42. A method according to claim 36, wherein providing transmitting-filter responses further comprises providing digital transmitting-filter responses.

43. A method according to claim 36, wherein transmitting a carrier signal further comprises transmitting a digital signal.

44. A method according to claim 36, wherein transmitting a carrier signal further comprises transmitting an analog signal.

45. A method according to claim 36, wherein providing transmitting-filter responses further includes providing temporally-shifted wavelet basis functions having compact support.

46. A method according to claim 36, wherein providing transmitting-filter responses further includes providing temporally-shifted shift-biorthogonal wavelet basis functions having compact support.

47. A method according to claim 36, wherein providing receiving-filter responses includes providing receiving-filter responses based on a shift-biorthogonal wavelet function.

48. A computer program product disposed on a computer readable medium for combining temporally overlapped symbols, the computer program product including instructions for causing a processor to:
provide transmitting-filter responses,
generate weighted signals by filtering the temporally overlapped symbols with the transmitting-filter responses, and,
combine the weighted signals throughout consecutive symbol start periods, where a symbol start period is at least one clock cycle.

49. A method according to claim 48, further comprising, modulating a phase component of a carrier signal based on the combined weighted signals.

50. A method according to claim 48, wherein combining the weighted signals further comprises accumulating the weighted signals.

51. A method according to claim 48, wherein providing transmitting-filter responses further comprises providing analog transmitting-filter responses.

52. A method according to claim 48, wherein providing transmitting-filter responses further comprises providing digital transmitting-filter responses.

53. A method according to claim 48, wherein providing transmitting-filter responses further includes providing temporally-shifted wavelet basis functions having compact support.

54. A method according to claim 48, wherein providing transmitting-filter responses further includes providing temporally-shifted shift-biorthogonal wavelet basis functions having compact support.

55. A transmitter for encoding a first symbol and a second symbol on a phase component of a carrier signal, the first symbol being transmitted during a first symbol transmission interval, the second symbol being transmitted during a second symbol transmission interval overlapping the first symbol transmission interval, the transmitter comprising
means for generating a first transmitting-filter-response in a first interval,
means for generating a first weighted signal based on the first transmitting-filter-response and the first symbol,
means for generating a second transmitting-filter response in a second interval overlapping the first interval,
means to generate a second weighted signal based on the second transmitting-filter-response and the second symbol,
means for generating a modulating quantity on the basis of at least the first weighted signal and the second weighted signal, and
means for phase modulating the phase component of the carrier signal on the basis of the modulating quantity, wherein the first symbol is modulated during a symbol start period that is adjacent to a symbol start period associated with the modulation of the second symbol.

56. A transmitter according to claim 55 wherein the means for generating a modulating quantity is adapted to sum the first weighted signal and the second weighted signal.

57. A transmitter according to claim 55 wherein the phase modulation means is adapted to set the phase component of the carrier signal to the modulating quantity.

58. A transmitter according to claim 55 wherein the means for generating the first and second transmitting-filter-responses are adapted to generate first and second transmitting-filter-responses that are shift biorthogonal to corresponding first and second receiving-filter responses generated by a receiving-filter generator in a receiver.

59. A transmitter according to claim 55 wherein the means for generating the first and second transmitting-filter-responses are adapted to generate first and second transmitting-filter-responses that are shift biorthonormal to corresponding first and second receiving-filter responses generated by a receiving-filter generator in a receiver.

60. A transmitter according to claim 55 wherein the means for generating the first and second transmitting-filter-responses are adapted to generate first and second transmitting-filter-responses that are shift orthogonal to corresponding first and second receiving-filter responses generated by a receiving-filter generator in a receiver.

61. A transmitter according to claim 55, wherein the symbol start period is at least one clock cycle.

62. A transmitter according to claim 55, wherein at least one of the first transmitting-filter response and the second transmitting-filter response is based upon at least one temporally-shifted wavelet function having compact support.

63. A transmitter according to claim 55, wherein at least one of the first transmitting-filter response and the second transmitting-filter response is based upon at least one temporally-shifted shift-biorthogonal wavelet function having compact support.

64. A receiver for extracting a selected symbol from a phase-modulated carrier having a phaseform representative of the selected symbol and at least two additional symbols having temporal overlap with the selected symbol, the selected symbol being transmitted during a selected-symbol transmission interval, the phaseform being generated by evaluating combination of transmitting-filter responses, the combination including a first element generated by weighting a selected transmitting-filter response by the selected symbol, the receiver comprising
means for demodulating the phaseform from the phase-modulated carrier,
means for generating a receiving-filter response corresponding to the selected transmitting-filter response wherein the receiving-filter response is produced by a wavelet function,
means for filtering the phaseform with the receiving-filter response to generate a weighted output representative of the combination of transmitting-filter responses weighted by the receiving-filter response, and
means for accumulating the weighted output over a symbol transmission interval, thereby generating a signal representative of the selected symbol, wherein the selected symbol is demodulated during a symbol start period that is adjacent to a symbol start period associated with the demodulation of at least one of the additional symbols.

65. A receiver according to claim 64, wherein the receiving-filter response is orthogonal to the transmitting-filter response.

66. A receiver according to claim 64, wherein the receiving-filter generator is adapted to generate a receiving-filter response shift-orthogonal to the selected transmitting-filter response.

67. A receiver according to claim 64, wherein the receiving-filter generator is adapted to generate a receiving-filter response shift-orthonormal to the selected transmitting-filter response.

68. A receiver according to claim 64, wherein the receiving-filter generator is adapted to generate a receiving-filter response shift-biorthogonal to the selected transmitting-filter response.

69. A receiver according to claim 64, wherein the accumulator is adapted to sum the weighted output at each of a plurality of times in the symbol transmission interval.

70. A receiver according to claim 64, wherein the accumulator is adapted to integrate the weighted the symbol transmission interval.

71. A receiver according to claim 64, wherein the symbol start period is at least one clock cycle.

72. A computer product disposed on a computer readable medium for separating temporally overlapped phase symbols from a signal, the computer product comprising instructions for causing a processor to, provide receiving-filter responses based on transmitting-filter responses used to combine the temporally overlapped symbols, the receiving-filter responses being at least one of shift-orthogonal, shift-orthonormal, and shift-bi-orthogonal to the transmitting-filter responses, generate weighted signals by filtering the signal with the receiving-filter responses, and, accumulate the weighted signals during symbol transmission intervals to separate the symbols, where a symbol start period is equal to at least one clock cycle.

73. A computer product according to claim 72, further comprising instructions to cause the processor to, receive the signal, and, demodulate the phase component of the signal for processing by the receiving-filter-responses.

74. A computer product according to claim 72, wherein the instructions to accumulate the weighted signals during symbol transmission intervals further include instructions to integrate the signals during symbol start periods.

75. A computer product according to claim 74, wherein the instructions to integrate the signals during symbol transmission intervals further comprise instructions to integrate the signals during symbol start periods equal to at least one clock cycle.

76. A computer product according to claim 72, wherein instructions to provide receiving-filter responses further comprise instructions to provide analog receiving-filter responses.

77. A computer product according to claim 72, wherein instructions to provide receiving-filter responses further comprise instructions to provide digital receiving-filter responses.

78. A computer product according to claim 72, wherein the instructions to provide the receiving-filter responses further include instructions to produce the receiving-filter responses based on a wavelet function.

79. A computer product according to claim 72, wherein the phase symbols are temporally overlapped in a transmitter.

80. A computer product according to claim 72, wherein the instructions to provide the receiving-filter responses further include instructions to provide receiving-filter responses shift orthogonal to at least one transmitting-filter response used to generate the overlapped phase symbols.

81. A computer product according to claim 72, wherein the instructions to provide the receiving-filter responses further include instructions to provide receiving-filter responses shift-biorthogonal to at least one transmitting-filter response used to generate the overlapped phase symbols.

82. A computer product according to claim 72, wherein the instructions to provide the receiving-filter responses further include instructions to provide receiving-filter responses shift orthonormal to at least one transmitting-filter response used to generate the overlapped phase symbols.

* * * * *